(12) United States Patent
Niemelä

(10) Patent No.: US 9,225,725 B2
(45) Date of Patent: *Dec. 29, 2015

(54) CONTROLLING ACCESS TO WEB CONTENT

(71) Applicant: F-Secure Corporation, Helsinki (FI)

(72) Inventor: Jarno Niemelä, Helsinki (FI)

(73) Assignee: F-Secure Corporation, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 14/280,886

(22) Filed: May 19, 2014

(65) Prior Publication Data

US 2014/0259119 A1 Sep. 11, 2014

Related U.S. Application Data

(63) Continuation of application No. 12/930,434, filed on Jan. 5, 2011, now Pat. No. 8,788,653.

(51) Int. Cl.
*G06F 15/16* (2006.01)
*H04L 29/06* (2006.01)

(52) U.S. Cl.
CPC ............ *H04L 63/102* (2013.01); *H04L 63/101* (2013.01); *G06F 2221/2149* (2013.01)

(58) Field of Classification Search
CPC .............. G06F 2221/2149; G06F 2221/2141; G06F 15/16; H04L 63/10; H04L 63/08
USPC .......................................... 709/224, 229, 245
See application file for complete search history.

(56) References Cited

U.S. PATENT DOCUMENTS

| | | | | |
|---|---|---|---|---|
| 7,904,554 | B1* | 3/2011 | Lu | G06Q 10/10 709/206 |
| 8,234,408 | B2* | 7/2012 | Jungck | H04L 29/12028 709/218 |
| 8,281,361 | B1* | 10/2012 | Schepis | G06F 17/30867 705/14.6 |
| 2003/0110159 | A1 | 6/2003 | Hirata | 707/1 |
| 2004/0172558 | A1* | 9/2004 | Callahan | H04L 63/08 726/2 |
| 2005/0085928 | A1 | 4/2005 | Shani | 700/18 |
| 2006/0149395 | A1 | 7/2006 | Archacki et al. | 700/19 |
| 2006/0212516 | A1* | 9/2006 | Shikatani | H04N 7/173 709/205 |
| 2006/0271695 | A1 | 11/2006 | Lavian | 709/229 |
| 2007/0142039 | A1* | 6/2007 | Bushnell | H04W 8/18 455/414.1 |
| 2009/0132367 | A1 | 5/2009 | Hamada et al. | 705/14 |
| 2009/0178116 | A1* | 7/2009 | Nagoya | G06Q 10/10 726/3 |
| 2009/0271861 | A1* | 10/2009 | Yoshida | G06F 21/74 726/17 |
| 2010/0169479 | A1* | 7/2010 | Jeong | H04L 63/1416 709/224 |
| 2010/0214217 | A1 | 8/2010 | Lin | 345/163 |
| 2010/0299751 | A1* | 11/2010 | Otani | G06F 9/30138 726/21 |
| 2012/0005719 | A1* | 1/2012 | McDougal | G06F 21/562 726/1 |

* cited by examiner

*Primary Examiner* — Tesfay Yohannes
(74) *Attorney, Agent, or Firm* — Harrington & Smith

(57) ABSTRACT

A method of controlling access to web content at a client computer. The method includes registering an access control status at the client computer, and detecting an attempt to access a website having an access control mechanism. In response to such detection, the access attempt is suspended and said access control status registered at the client computer compared with an access control status currently registered at the website. If these do not correspond, then the access control status registered at the website is changed to correspond with that registered at the client computer.

11 Claims, 2 Drawing Sheets

CONTROLLING ACCESS TO WEB CONTENT

CROSS REFERENCE TO RELATED APPLICATION

This application is a continuation of U.S. patent application Ser. No. 12/930,434, filed on Jan. 5, 2011, the disclosure of which is incorporated herein by reference in its entirety.

TECHNICAL FIELD

The present invention relates to a method of controlling access to web content at a client computer connected to the Internet. The invention also relates to a computer configured to implement such a method, and to a corresponding computer program. The invention is applicable in particular, though not necessarily, to a mechanism for preventing the downloading and display of unsuitable content at client computers connected to the Internet.

BACKGROUND

Much of the content available for downloading from the world wide web (www) is unsuitable for viewing by children. This includes in particular material of an adult or otherwise disturbing nature. Even adult users may wish to be protected from viewing material that they deem to be offensive. Organisations and businesses also often wish to restrict access to such material to prevent employees from viewing this material during working hours. Users that have restrictions imposed upon them, or choose to apply restrictions to themselves, are referred to below as "restricted users". Content that should not be provided to such users is referred to as "restricted content".

Access to unsuitable material may be controlled by implementing software procedures on client computers and/or local area network servers. For example, software may be run on a client computer which integrates or interfaces with a web browser application to filter outgoing web access requests and received web pages and data. Such mechanisms often rely on parsing incoming and outgoing data to detect the occurrence of suspicious text and or images, for example by matching this data against a database of known suspicious data. Another mechanism for restricting access involves maintaining at the client computer a database of suspicious websites (e.g. by recording uniform resource locators, URLs) corresponding to known websites to which access should be restricted, intercepting web download requests generated by a web browser, and blocking access when the URLs of the outgoing requests match those in the stored database. An alternative approach is to define at the client computer a white list of approved URLs, and to restrict access to only those URLs.

The known approaches are very effective at blocking access to websites, such as adult websites, which are wholly dedicated to distributing restricted content and which have no other content which a restricted user might otherwise wish to view. There are however certain websites which restricted users may wish to view for legitimate purposes but which also provide restricted content. Examples of such sites include Google™ and Youtube™ as well as other search engines and file sharing sites. In such cases, for example, an employee at an organisation implementing access restrictions may wish to view a particular video on Youtube which is not offensive and required for a valid work purpose. This should be allowed, whilst at the same time the user should be prevented from viewing restricted content. The approach described above of restricting access at the client to certain websites is unlikely to be effective in this situation, as it is highly unlikely that the restriction list maintained at the client will include web URLs in sufficient detail to discriminate between restricted and unrestricted pages within the website. Content filtering on the other hand may allow certain restricted content to pass, while blocking certain unrestricted content.

As well as implementing restrictions on the client side, some websites including Google and Youtube offer a further level of protection by allowing users to register a status with a website based "parental" control mechanism. These mechanisms generally rely upon a username and password in order to set and modify the registered status. Once registered, data is stored at the client computer, e.g. by way of a cookie, such that any request sent from the client computer to the website is handled according to the status previously registered at the website. A possible problem with at least some of these website-based control mechanisms is that they allow a restricted user to create a new, alternative user profile set for unrestricted access, effectively over-riding a restrictive profile previously established at the website by a parent or administrator. Assuming that access to the website is not otherwise restricted on the client side, the creation of the alternative profile allows the restricted user to gain unrestricted access to the website. Even if the restricted user is unable to create such a fake profile at a website, the existing security approaches rely of course upon a parent or administrator initially creating a restricted profile at the website. It will be appreciated that, for many parents and administrators, this may not be the case particularly for sites that are not known or used by the parent/administrator.

SUMMARY

It is an object of the present invention to allow a parent or computer administrator to easily and, to a large extent automatically, ensure that website-based parental control mechanisms are correctly applied when handling website requests generated by a client computer. This and other objects are achieved by registering a parental control status at the client computer and ensuring that this registered status is enforced by a website-based parental control mechanism.

According to a first aspect of the present invention there is provided a method of controlling access to web content at a client computer. The method comprises registering an access control status at the client computer, and detecting an attempt to access a website having an access control mechanism. In response to such detection, the access attempt is suspended and said access control status registered at the client computer compared with an access control status currently registered at the website. If these do not correspond, then the access control status registered at the website is changed to correspond with that registered at the client computer.

Embodiments of the invention may be used to prevent a user of the client computer circumventing a previously set access control status at a website, and will ensure that a status is set where none was previously set. Providing that access to the service handling the status check and setting at the client computer is restricted, e.g. with a username and password, the method presents a secure and very easy to use solution.

Reference here to an access attempt is intended to cover various website access attempts, including, for example, logging on to a website for the first time, accessing pages and content within a website, etc.

The method may comprise providing at the client computer a list of web addresses, each address corresponding to a website having an access control mechanism allowing access to certain content to be controlled. In this case, said step of detecting an attempt to access a website having an access control mechanism may comprise comparing a web address associated with the access attempt against web addresses in said list. A partial match, e.g. of a top-level part of a URL, may be sufficient to indicate detection of an attempt to access a website having an access control mechanism.

Typically, said addresses contained within the list are Uniform Resource Locators, URLs. An attempt to access one of the websites may comprise the entry of the URL into the address line of a web browser, or the clicking on a link in a webpage or other document where the link is associated with the URL. The method comprises intercepting the submitted URL and suspending the access attempt until the check is performed.

It will be appreciated that the addresses within the list may be IP addresses whereby IP addresses entered at the client computer, or resolved from URLs entered at the client terminal, are compared against the IP addresses in the list.

The method may be applied on a per user profile basis, where the or each user profile implemented at the client computer is associated with an access control status registered at the client computer.

According to one embodiment of the present invention, said predefined list of addresses is maintained at the client computer. Access to that list is controlled to prevent unauthorised modifications being made. Updates to the list may be pushed or otherwise downloaded to the client computer from a server operated by a provider of security software, e.g. to which a user of the client computer subscribes. Alternatively, the predefined list of addresses may be maintained at a server, with a component at the client computer forwarding website addresses entered at the client computer to the server for checking. In this case, the server receives the requested URL, checks this against the list, and returns a response to the client computer indicating the result.

The step of comparing an access control status registered at the client computer with an access control status currently registered at the website may comprise downloading from the website to the client a webpage indicating the access control status currently registered at the website. The client computer may maintain addresses of such web pages. These addresses are mapped to corresponding addresses within said predefined list of addresses. Where the method comprises changing the parental control status registered at the website to correspond with that registered at the client, the client may further download from the website a webpage allowing the setting of the parental control status registered at the website. Again, the client may maintain a list of addresses of such web pages and, if required, appropriate data entry fields and settings within the web pages. The links may be associated with corresponding addresses within said predefined list of addresses.

It will be appreciated that the method presented above is automated in the sense that the user is not involved in the URL scanning and status checking/changing process. Indeed, this may be transparent to the user.

The method may be implemented by way of an application or set of applications running on the client computer. The method may be implemented as a web browser plug-in or similar program.

According to a second aspect of the present invention there is provided a computer program for causing a client computer to control access to web content at the client computer. In particular, the computer program causes the client computer to register an access control status at the client computer, and detect an attempt to access a website having an access control mechanism. In response to such detection, the access attempt is suspended and the access control status registered at the client computer is compared with an access control status currently registered at the website. If these do not correspond, the access control status registered at the website is changed to correspond with that registered at the client.

According to a third aspect of the present invention there is provided a computer configured to operate as a client computer to provide a user with access to web content over the Internet. The computer comprises a registration unit for registering an access control status, and a monitoring unit for detecting an attempt to access a website having an access control mechanism. This monitoring unit is configured, in response to such detection, to suspend the access attempt and compare said access control status registered at the client computer with an access control status currently registered at the website. The monitoring unit is further configure, if these do not correspond, to change the access control status registered at the website to correspond with that registered at the client computer.

DETAILED DESCRIPTION

As has been discussed above, a problem with current Internet services is that, whilst certain websites implement custom parental control mechanisms in order to enforce safe or otherwise controlled browsing by end users, it can be relatively simple for the end users to override the custom mechanisms, for example by creating alternative, fake profiles and registering these with the website.

It is proposed here to address this problem by implementing a service at the client computer, for example a service that cooperates with a web browser running on the client computer, that is aware of a parental control status registered for the user at the client computer and which ensures that this status corresponds to the status that is currently registered at a website being accessed (and which implements a parental control mechanism).

In the following discussion, reference is made to a "user instance" to identify a particular user session being implemented at a client computer. Often, several user profiles are created at a single client computer with different settings being applied to each. For example, a parent family member may have a personal user profile which allows the parent to have administrator access rights to all profiles, whilst a child has its own profile with settings imposed by the parent. When a user logs onto the computer using his or her own user profile, a user instance conforming to that profile is established.

Figure 1:
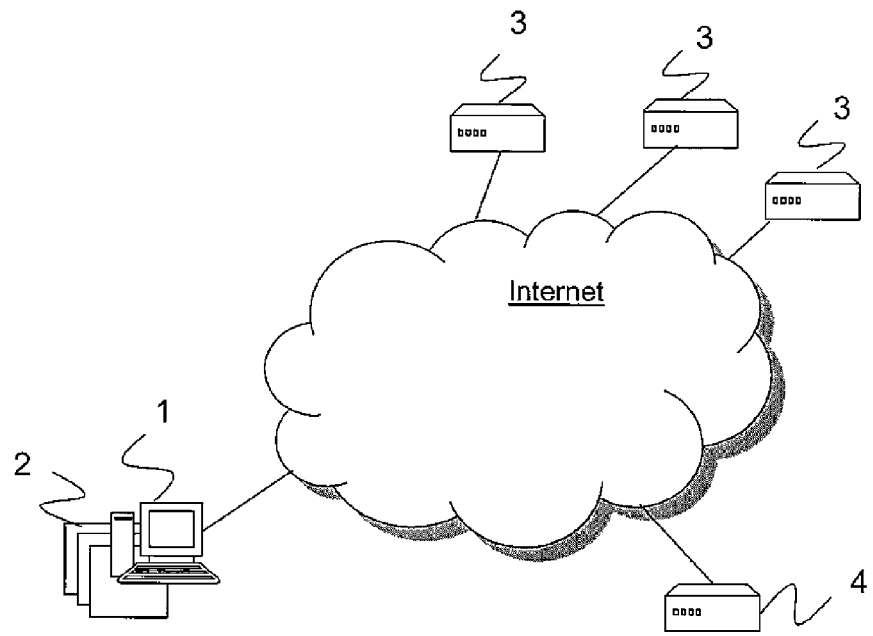
FIG. 1 illustrates schematically a computer network with connectivity provided via the Internet.

FIG. 1 illustrates schematically a computer network in which the Internet provides a communication channel between computers coupled to it. The Figure illustrates an example client computer 1 which is configured with a set of (three) user profiles 2, i.e. allowing three different users to use the computer 1 according to their pre-set profiles. A number of web servers 3 are also coupled to the Internet and provide respective web services. A security server 4 is also coupled to the Internet and provides data to client computers to enable these computers, including illustrated computer 1, to implement the security service described below.

It is envisaged that parental control policies are applied to the different user profiles by way of a security service that is also running on the client computer. The security service may be implemented, for example, by way of a standalone software application, as part of a general security application such as an Internet security application, or as a web browser plug-in. Typically, a parent having administrator rights set for his or her profile would also have a username and password which allows them to use the security application to impose a Parental control status on the various user profiles. For example, the parent may set the parental control status for his or her own user profile to an unrestricted status, whilst the status of a child user profile is set to a restricted or safe-mode status. Once set, the security application would not allow the status for a particular user profile to be changed without input of the correct username and password.

The security service implemented on the client computer maintains a database of popular web-based services which support parental control. This database typically comprises, for each such service, a top level Uniform Resource Locator (URL). For example, the database may contain for the Google website service the URL "www.google.com". Similarly, for the Youtube service the database includes the URL "www.youtube.com". In addition, the database includes for each such service, instructions detailing how to obtain the current parental control status for an ongoing session involving the website. For example, in the case of the Google service, the instructions identify the page "hftp://www.google.com/preferences?hl=en", as well as an identification of the status field "safe UI" within that webpage. In the case of the Youtube service, the Youtube URL is mapped to instructions that specify that a safety mode setting is identified at the bottom of every Youtube page. The database associated with the security service may be updated periodically with data sent to the client computer, via the Internet, from a web server operated by the provider of the security service.

Typically, the security application runs automatically on starting up the computer, or is run automatically when a web browser is opened, and running of the security application can only be stopped by the administrating user. Upon start-up, the security application determines the identity of the user that is currently logged-on to the computer, and retrieves the previously set parental control status for that user. The security service then operates to enforce this status.

The security service monitors all web download requests generated by the current user instance on the client computer. Requests may be generated, for example, by a user entering a URL into the address line of a web browser or by clicking on a link in a page displayed in the web browser window or, for example, in an email or other document format. The security service will typically intercept outgoing requests, e.g. http Get requests, and, rather than immediately processing and sending the download requests to a destination website, the security service is configured to delay the requests pending security checks. In particular, the security service determines whether or not the submitted URL matches any URL in the database. A match may be found, for example, when a submitted URL exactly matches a URL within the database. A match may also be identified when a top level part of the submitted URL matches the URL within the database. Thus, for example, a match would be found when a user enters the domain name "www.video.google.co.uk" when the database only contains the URL "www.google.co.uk". If no match is found, the security service may allow the request to be submitted, depending of course upon local filter rules and, for example, a requested webpage is loaded into a browser window. In some cases, local rules (e.g. enforced by a parental control mechanism within the web browser) may block submission to sites that are not included on an authorised browsing list held at the client computer.

If a match is found for the submitted URL in the database, this indicates to the security service that a parental control mechanism is employed at the corresponding website, and that a check should be made on the status currently set on that parental control mechanism. The security service therefore obtains from its database the instructions for checking and handling this status. Considering the above examples, for a Google related URL submission, the security application will request the page "http://www.google.com/preferences?hl=en", and will determine the status of the field "safe UI" in the downloaded page. The security service may download the relevant page independently of the web browser, or at least in such a way that the page is not displayed in an open browser window.

The security service then checks the determined website parental control status against the status held by the security service for the user profile currently in use. If the former is less restrictive than the latter, the security service will follow instructions to cause the website parental control status to be changed to a more restrictive level. In the case of Google, this will involve the construction and submission of the form request "google.com/setpres". The security service will repeat this procedure each time the user tries to access the Google site. This could be at each fresh attempt to access the site, or at each attempt to access content once an initial access has been made. The latter prevents a user from circumventing the security mechanism by resetting the website parental control mechanism once an initial access has been made. For example, the security procedure may be repeated each time a user clicks on a link to download new content from the website.

The security service may be implemented such that it does not perform checks on URL submissions where the status held by the service for an in-use user profile is set to unrestricted. This avoids unnecessary checks being performed.

In a simple scenario, parental control has two status, namely on and off, where on represents restricted access and off represents unrestricted access. The security service may of course maintain some mapping between its own available status, and the status offered by different websites. This is likely to be required where different websites offer differing numbers and degrees of status.

Following the parental control status check, and the resetting of the website status if required, the security service allows the URL submission to proceed. As the parental control status is now correctly set at the relevant website, the download request will be allowed or denied by the website depending upon the set status.

Figure 2:
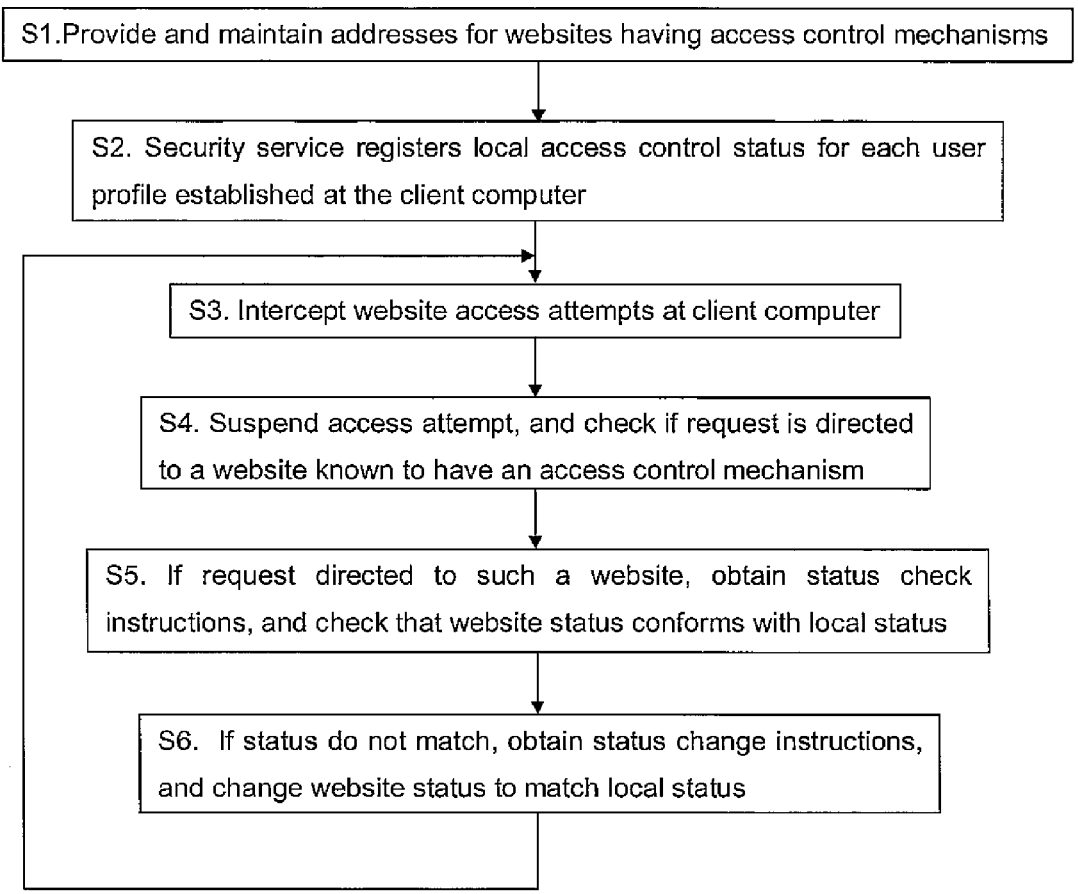
FIG. 2 is a flow diagram illustrating a method of controlling access to web content at a client connected to the Internet.

FIG. 2 is a flow diagram illustrating the above web browsing control method. In line with the process described above, the security service provides and maintains, at step S1, addresses for websites having access control mechanisms. At step S2, the security service registers a local access control status for each user profile established at the client computer, and at step 33 intercepts website access attempts at the client computer. At step S4, the security service suspends the intercepted access attempt, and checks if the request is directed to a website known to have an access control mechanism. At step S5, if the request is directed to such a website, the check status instructions are obtained locally, and a check made to determine if the website status conforms with the local status. Finally, at step S6, if it is determined that the status do not match, status change instructions are obtained locally, and the website status changed to match the local status.

Figure 3:
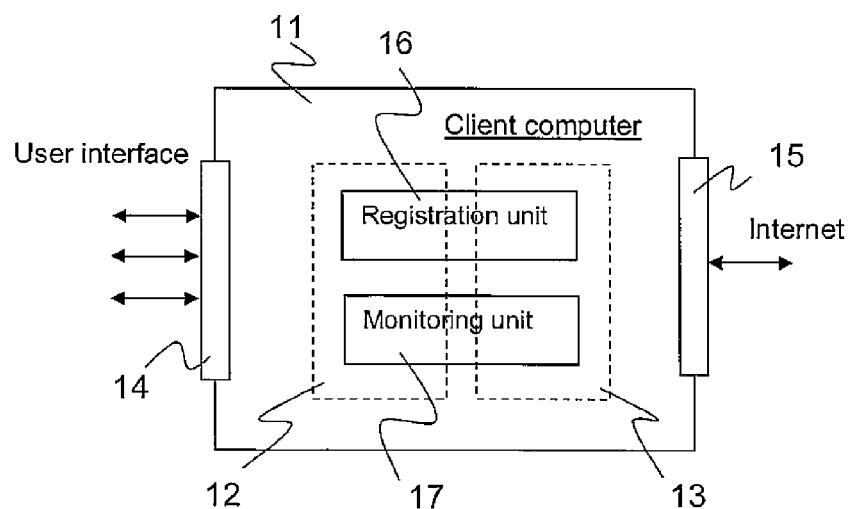
FIG. 3 illustrates schematically a client computer coupled to the Internet for the purpose of accessing websites.

FIG. 3 illustrates schematically a computer 11 configured to implement the method of FIG. 1. The computer comprises hardware components 12 and software components 13 for implementing various functionality including the security functions discussed above. In addition, user interface functions 14 are implemented to allow a user to interact with the computer, whilst an interface 15 to the Internet allows the computer to interact with web servers and other internet services. Considering further the security functions, these comprise a registration unit 16 for registering an access control status, and a monitoring unit 17 for detecting an attempt to access a website having an access control mechanism. This monitoring unit 17 operates further as discussed above, to suspend the access attempt if it is directed to a website having an access control mechanism, and to compare the access control status registered at the client computer with an access control status currently registered at the website and, if these do not correspond, to change the access control status registered at the website to correspond with that registered at the client computer.

It will be appreciated by the person skilled in the art that various modifications may be made to the above described embodiments without departing from the scope of the present invention. For example, the security mechanism may implement a function to prevent a user changing a website's access control status once an initial access has been made. This could involve preventing the user from accessing or changing a specific access control web page of the website and/or accessing a web page for creating a new profile.

In a further modification, the security mechanism may comprise a function for returning a reset website access control status to its original setting following the logging off of a controlled user. For example, a child may log onto a website using his or her parent's website account. The security mechanism will change the access control status at the website to match the child's local access status. When the child subsequently closes the browser or otherwise terminates the session, the security mechanism will return the website access status to its original (i.e. parent) setting.

The invention claimed is:

1. A method of controlling access to web content at a client computer, the method comprising:
registering an access control status at the client computer, the access control status determining the level of access a user at the client computer has to content on a website having an access control mechanism;
providing a web browser plugin on a web browser of the client computer;
utilising the plug-in to detect an attempt to access a website via the web browser, the website having an access control mechanism and, in response, suspending the access attempt and comparing said access control status registered at the client computer with an access control status currently registered at the website and, if these do not correspond, then changing the access control status registered at the website to correspond with that registered at the client computer; and
applying the method on a per user profile basis, where each user profile implemented at the client computer to access the website is associated with an access control status registered at the client computer.

2. A method according to claim 1 and comprising providing at the client computer a list of web addresses, each address corresponding to a website having an access control mechanism allowing access to certain content to be controlled, said step of detecting an attempt to access a website having an access control mechanism comprising comparing a web address associated with the access attempt against web addresses in said list.

3. A method according to claim 1, wherein said step of comparing an access control status registered at the client computer with an access control status currently registered at the website comprises downloading from the website to the client computer a webpage indicating the access control status currently registered at the website, and checking the value of a status field within that webpage.

4. A method according to claim 3 and comprising maintaining an address of said webpage at the client computer, mapped to the corresponding web address in said list.

5. A method according to any one of claims 1, wherein said step of changing the access control status registered at the website to correspond with that registered at the client computer comprises downloading from the website a status change webpage allowing the setting of the parental control status registered at the website and submitting a change request using said status change webpage.

6. A method according to claim 5 and comprising maintaining an address of said status change webpage at the client computer and instructions for making a status change, mapped to the corresponding web address in said list.

7. A method according to claim 1, and comprising maintaining at the client computer a list of addresses for websites having access control mechanisms against which access requests are compared, and further maintaining instructions, for each such website, for checking and altering that access control status of the website.

8. A method according to claim 1 and comprising, following the changing of an access control status registered at the website, subsequently returning that status to its original state following the termination of a browsing session.

9. A method according to claim 8 and comprising, following the changing of an access control status registered at the website, subsequently preventing further changes to that status at least for the duration of the browsing session.

10. A non-transitory medium storing a computer program for causing a client computer to control access to web content at the client computer, the computer program causing the client computer to:
register an access control status at the client computer, the access control status determining the level of access a user at the client computer has to content on a website having an access control mechanism;
detect an attempt to access a website having an access control mechanism and, in response, suspend the access attempt and compare said access control status registered at the client computer with an access control status currently registered at the website and, if these do not correspond, to then change the access control status registered at the website to correspond with that registered at the client computer on a per user profile basis, where each user profile implemented at the client computer to access the website is associated with an access control status registered at the client computer;
wherein the computer program is a plug-in for a web browser.

11. A computer configured to operate as a client computer to provide a user with access to web content over the Internet, the computer comprising:
a processor;
a registration unit for registering an access control status, the access control status determining the level of access a user at the client computer has to content on a website having an access control mechanism; and a monitoring unit for utilising a plugin of a web browser to detect an attempt to access a website having an access control mechanism via the web browser and, in response, for suspending the access attempt and comparing said access control status registered at the client computer with an access control status currently registered at the website and, if these do not correspond, then changing the access control status registered at the website to correspond with that registered at the client computer on a per user profile basis, where each user profile implemented at the client computer to access the website is associated with an access control status registered at the client computer.

* * * * *